US006598025B1

United States Patent
Hamilton et al.

(10) Patent No.: US 6,598,025 B1
(45) Date of Patent: Jul. 22, 2003

(54) GEOSPATIAL INVENTORY CONTROL

(75) Inventors: Brian J. Hamilton, Winchester, CA (US); Diane M. Wewerka, Poway, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/752,354

(22) Filed: Dec. 29, 2000

(51) Int. Cl.$^7$ .............................. G06F 17/60; G06G 1/14
(52) U.S. Cl. ........................ 705/22; 705/28; 340/5.92; 340/825.72
(58) Field of Search ............... 705/28, 22, 16; 340/5.91, 5.92, 825.72

(56) References Cited

U.S. PATENT DOCUMENTS

| | | | |
|---|---|---|---|
| 4,002,886 A | * | 1/1977 | Sundelin .................... 340/5.92 |
| 5,448,226 A | * | 9/1995 | Failing, Jr. et al. ..... 340/825.36 |
| 5,572,653 A | * | 11/1996 | DeTemple et al. ..... 340/825.72 |
| 5,671,362 A | * | 9/1997 | Cowe et al. ........... 340/825.36 |
| 5,878,401 A | * | 3/1999 | Joseph ......................... 705/22 |
| 6,016,481 A | * | 1/2000 | Failing, Jr. et al. ........... 705/28 |
| 6,105,004 A | * | 8/2000 | Halperin et al. .............. 705/28 |
| 6,195,006 B1 | * | 2/2001 | Bowers et al. ........... 340/572.1 |
| 6,269,342 B1 | * | 7/2001 | Brick et al. ................... 705/22 |
| 6,341,269 B1 | * | 1/2002 | Dulaney et al. ............... 705/22 |

FOREIGN PATENT DOCUMENTS

WO    WO 0061438    * 10/2000

OTHER PUBLICATIONS

Flanagan, D, Inventory Control by BPI, Mar. 1983, Personal Computer Age, v2.3, p91–97.*
Lum, Sarah "Making Toys Work" Supermarket Business, v39, p47(4).*
Snyder, Glenn "Non–Foods Adds to Rainbow's Pot of Gold" Progressive Grocer, v66, p83(5).*

* cited by examiner

Primary Examiner—Kenneth R. Rice
Assistant Examiner—Lynda Jasmin
(74) Attorney, Agent, or Firm—John D. Cowart

(57) ABSTRACT

An inventory-management system includes data-collection terminals that acquire product-identification data identifying products placed on store shelves, product-placement data identifying the locations of the products in the store, and sales data providing information about sales of the products. The system also includes a database that receives and stores the product-identification, product-placement, and product sales data collected by the terminals. A database-query component queries the database to identify relationships between product sales and product placement.

29 Claims, 4 Drawing Sheets

GEOSPATIAL INVENTORY CONTROL

BACKGROUND

Retail merchants have long understood that careful product placement in retail stores can boost product sales. Merchants, in selecting where products are displayed in their stores, commonly leverage the product associations that occur in the minds of typical consumers. By placing complementary products near each other, merchants passively suggest purchases that the customers might not otherwise be inclined to make. For example, soft drinks and cheese dips are commonly consumed with potato and tortilla chips. Knowing this, merchants frequently place all of these items very close to each other so that consumers who plan to buy one must pass by, and often will decide to purchase, the others.

Merchants historically have had to rely on instinct, common sense, and manual review of sales data to assess the impact of product placement on sales. Merchants have had little help from the information-technology industry in making product-placement decisions.

SUMMARY

An inventory-management system includes data-collection terminals that acquire product-identification data identifying products placed on store shelves, product-placement data identifying the locations of the products in the store, and sales data providing information about sales of the products. The system also includes a database that receives and stores the product-identification, product-placement, and product sales data collected by the terminals. A database-query component queries the database to identify relationships between product sales and product placement.

DETAILED DESCRIPTION

Figure 1:
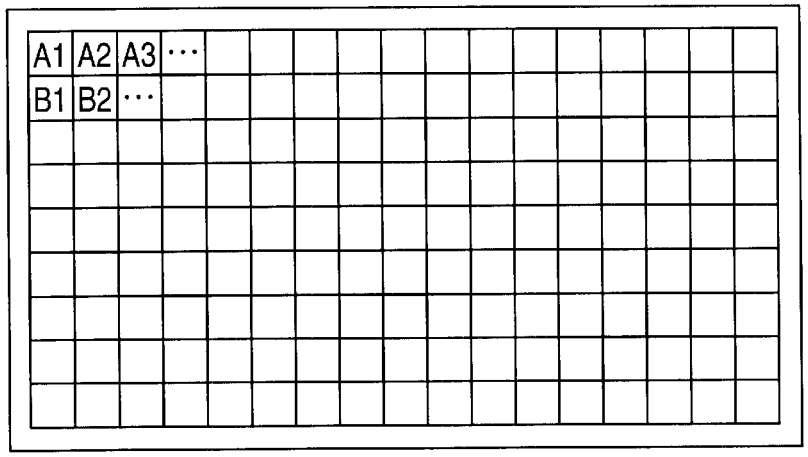
FIG. 1 is a view of a geospatial grid imposed on the floor plan of a retail store.

FIG. 1 shows a geospatial grid 100 imposed upon the floor plan of a retail store. Every geospatial location, and thus every product, in the retail store falls within one of the blocks of the grid 100. As described below, the merchant that operates the retail store uses the grid to map product placement in the store and uses a database-management system to track the impact of product placement on product sales. The granularity of the geospatial grid 100, and thus the grid size, depends upon the needs of the individual merchant. The finer the grid, the more precisely the merchant can monitor the placement of products in the store.

Figure 2:
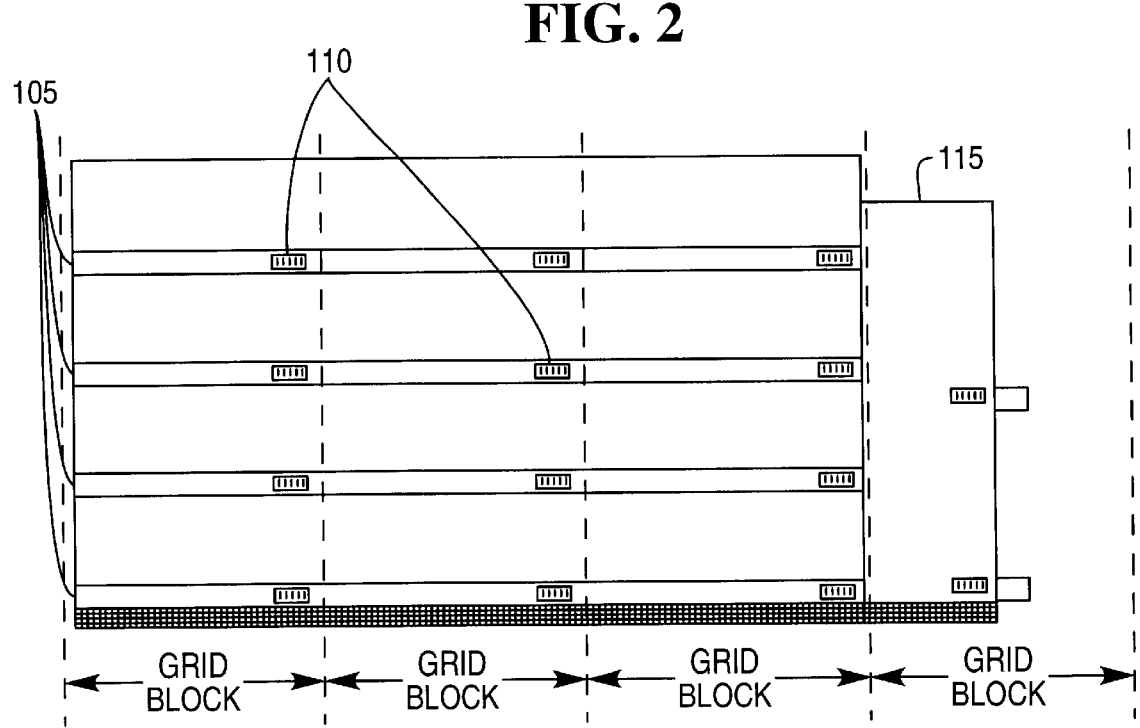
FIG. 2 is a view of retail-store shelves having labels that identify the shelves' geospatial locations in the store.

FIG. 2 shows a set of storage shelves 105 in a retail store. The shelves 105 each include one or more labels 10, markers, or other mechanisms, such as bar-code labels or infrared (IR) labels, which identify the geospatial locations of products displayed on the shelves 105. The labels 110 indicate not only the product's position in the geospatial grid, but also its vertical placement, or distance from the floor. As a result, the labels 110 indicate the precise location of each product in three dimensions. In general, these geospatial-location labels 110 are found on main display shelves 105 and in special display locations, such as end caps 115, islands, service counters, and check-out stands, throughout the store.

Figure 3:
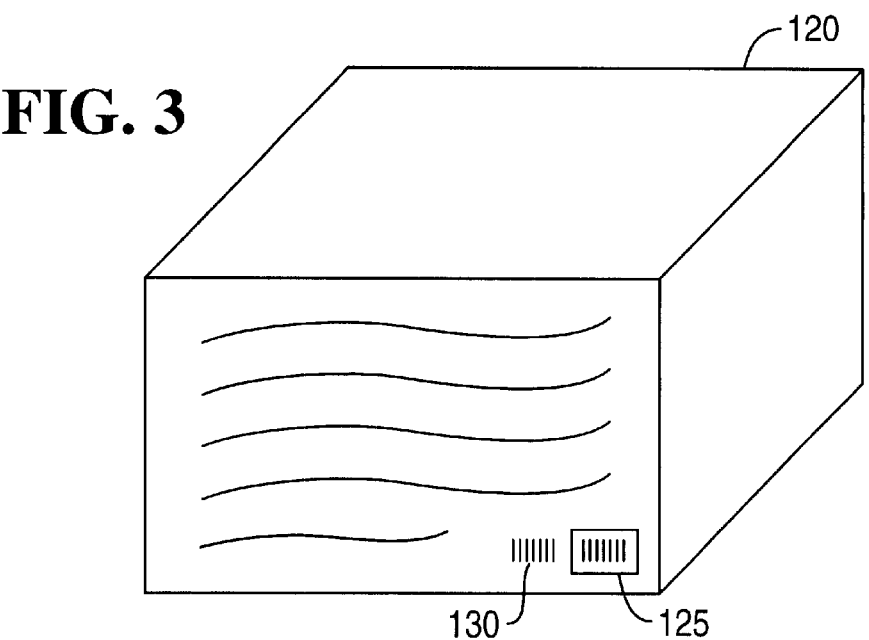
FIG. 3 is a view of a product having a geospatial-location label on its packaging.

FIG. 3 shows another mechanism for identifying the geospatial location of a product in a retail store—a location label 125 placed on the product 120 by the merchant. In one example, the location label 125 is a supplemental bar-code label placed very near the product's Universal Product Code (UPC) label 130. Placing the location label 125 near the UPC label 130 allows scanning of both labels 125, 130 at the same time. One benefit of this approach is that the product 120 itself identifies its location in the store, so the merchant is able to distinguish between identical products that are placed in different locations in the store (e.g., a particular soft-drink product that is located both on the soft-drink aisle and at an end cap near the potato chips).

Figure 4:
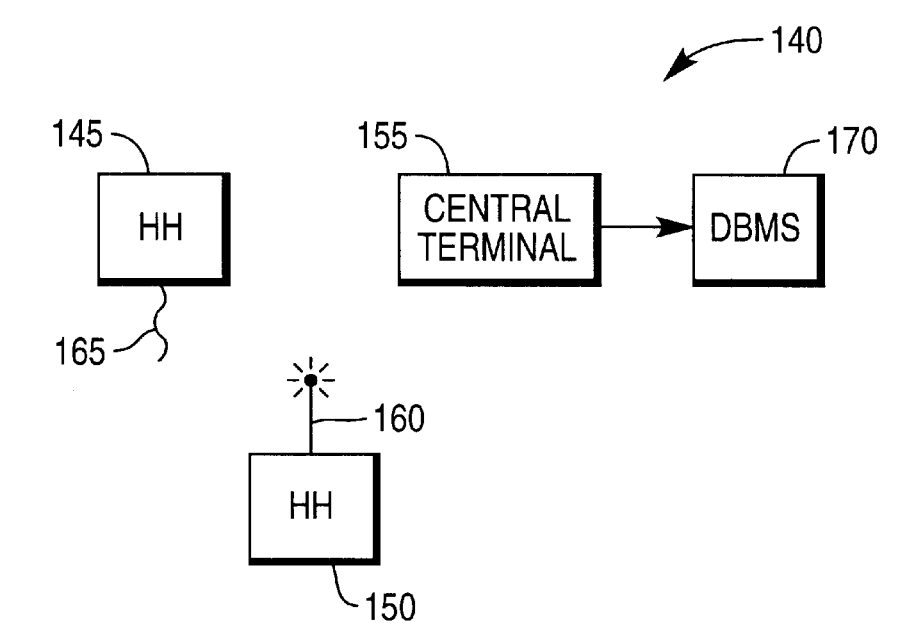
FIG. 4 is a schematic diagram of a system for use in acquiring, storing, and analyzing information about the geospatial locations of products in a retail store.

FIG. 4 shows a system 140 for use in acquiring, storing, and analyzing information from geospatial-location labels. The system 140 includes one or more hand-held units 145, 150 used to scan product-ID and location labels as the products are placed on store shelves. In some systems, the hand-held units 145, 150 are also used to create supplemental bar-code labels that are fixed to the product packaging as the shelves are stocked (see FIG. 3).

The hand-held units 145, 150 deliver data gathered from product packages and store shelves to a central terminal 155. Some hand-held units 150 deliver data to the central terminal 155 as the data is collected on the store floor, e.g., through an RF antenna 160 or other wireless link. Other hand-held units 145 store data until connected to the central terminal 155 through a cable 165 or other electrical conduit. The central terminal 155 typically includes a standard desktop or laptop computer located somewhere within the retail store. In some establishments, the central terminal 155 is networked to other terminals within the store and in other stores.

The central terminal 155 connects to a database-management system (DBMS) 170, such as a Teradata @ctive Warehouse™ system available from NCR Corporation. The DBMS 170 periodically receives data from the central terminal 155 and stores the data in one or more database tables. As described below, the DBMS 170 is used to analyze product data and to assist the merchant in making a wide variety of decisions, including when and how to purchase products and where to place those products in the store to maximize profits. In some cases, the DBMS 170 is located physically at the retail store; in others, the DBMS 170 is located at some remote location. Many retail establishments use a remote DBMS to track the activities of many stores located in a variety of places.

Figure 5:
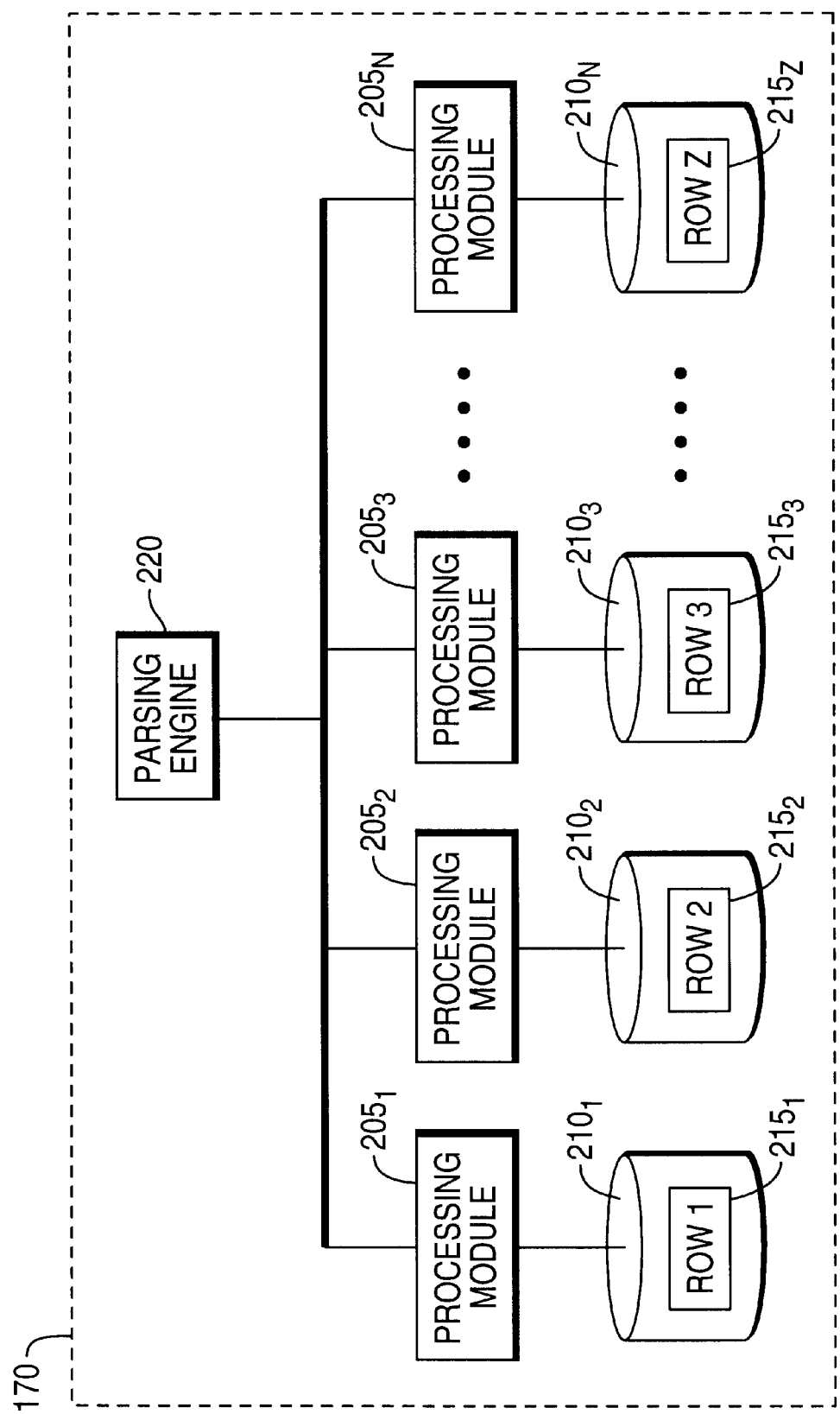
FIG. 5 is a schematic diagram of a database-management system for use in managing and analyzing information about the geospatial locations of products in a retail store.

FIG. 5 shows a sample architecture for the DBMS 170. The DBMS 170 includes one or more processing modules $205_{1 \ldots N}$ that manage the storage and retrieval of data in data-storage facilities $210_{1 \ldots N}$. Each of the processing modules $205_{1 \ldots N}$ manages the portion of the database that is stored in a corresponding one of the data-storage facilities $210_{1 \ldots N}$. Each of the data-storage facilities $210_{1 \ldots N}$ includes one or more disk drives.

The system stores product data, including geospatial-location data and sales data, in one or more tables in the data-storage facilities $210_{1 \ldots N}$. In general, the rows $215_{1 \ldots Z}$ of the tables are stored across multiple data-storage facilities $210_{1 \ldots N}$ to ensure that the system workload is distributed evenly across the processing modules $205_{1 \ldots N}$. A parsing engine 220 organizes the storage of data and the distribution of table rows $215_{1 \ldots Z}$ among the processing modules $205_{1 \ldots N}$.

The parsing engine 220 also coordinates the retrieval of data from the data-storage facilities $210_{1 \ldots N}$ in response to queries received from the merchant. The DBMS 150 usually receives queries in a standard format, such as the Structured Query Language (SQL) put forth by the American National Standards Institute (ANSI). These queries are carefully constructed by the merchant to uncover relationships between product sales and product placement.

Figure 6:
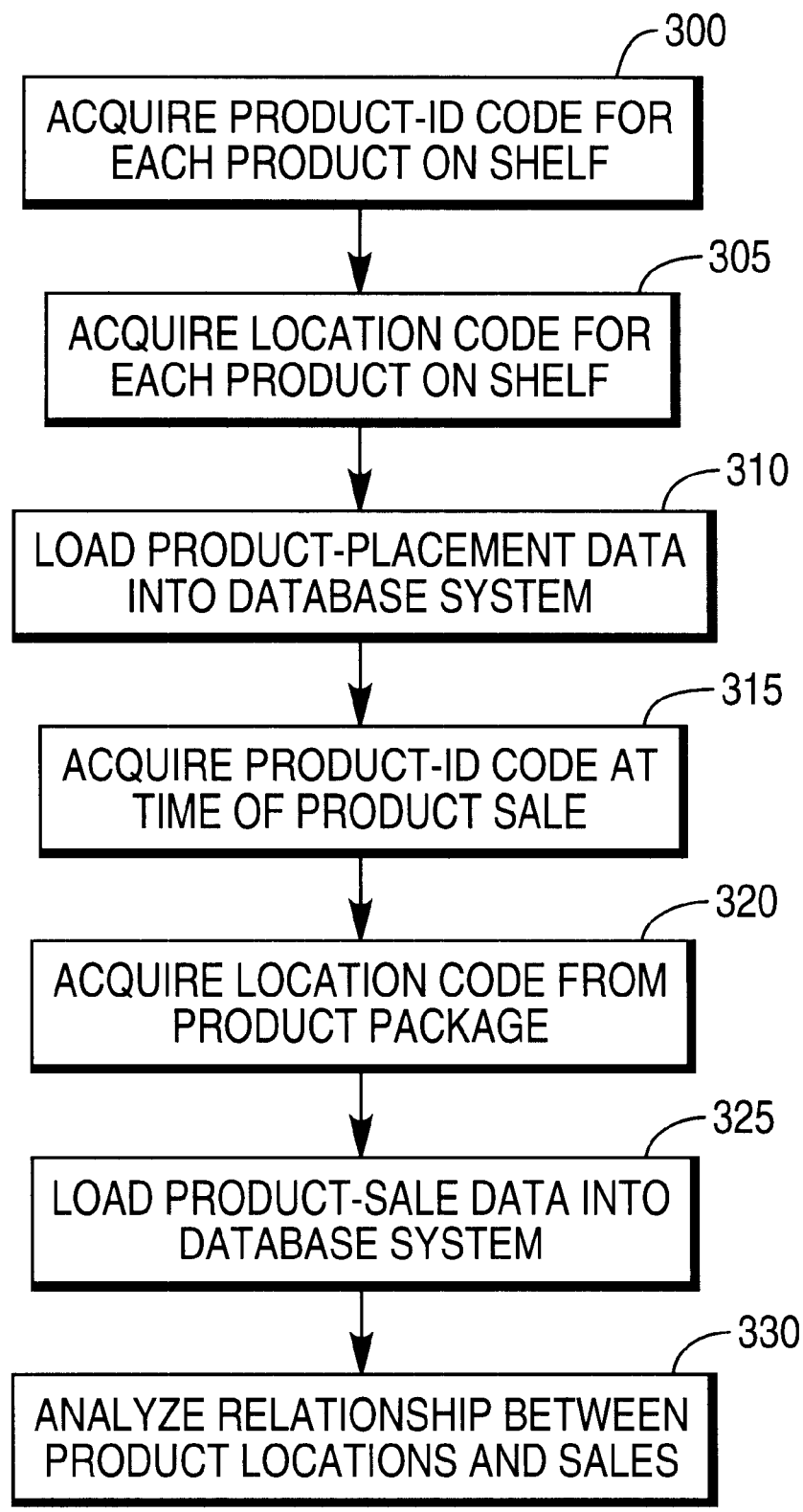
FIG. 6 is a flow chart of a technique for acquiring and storing information about the geospatial locations of products in a retail store.

FIG. 6 illustrates one technique for use in tracking the placement of products in a retail store and analyzing the relationship between product placement and product sales. When stocking store shelves, the merchant acquires the product-ID code for each product placed on the shelves, such as by scanning the UPC label found on most product packages (step 300). The merchant also acquires a location code for each product, such as by scanning location labels on the store shelves or on the product packages themselves (step 305). At some point, the merchant loads the acquired product-placement information into a database system (step 310).

As customers purchase the products, the merchant again acquires the product-ID codes (step 315) and, if package labels are used, the geospatial-location codes (step 320) using standard check-out equipment, such as optical bar-code scanners. At some point, the merchant loads the acquired product-sales information into the database system (step 325). The merchant then uses the database system to conduct queries against this data, analyzing the relationships between product placement and product sales (step 330).

Using a powerful database-management system such as the Teradat @ctive Warehouse™ system allows the merchant to submit very complex database queries and perform complex analyses of the product-placement and product-sales data. Over time, the data stored in the merchant's database system provides invaluable assistance in making decisions on store layout, inventory placement, and product symbiosis. Below is a list of sample database procedures and triggers useful in assisting the merchant in making these types of decisions.

CREATE PROCEDURE optimal_distance (product1 UPC_CODE, product 2 UPC_CODE, date_range TIMESERIES): Examines product-placement and product-sales data over time and calculates the optimal distance between two products that would maximize joint sales between the products.

CREATE PROCEDURE max_distance (product1 UPC_CODE, product UPC_CODE, date_range TIMESERIES): Examines product-placement and product-sales data over time and calculates the maximum distance between two products that would still lead to increased or acceptable levels of joint sales between the products.

CREATE PROCEDURE average_sales (product_type1 INTEGER, product_type2 INTEGER): Examines product-placement and product-sales data over time and determines which product groupings produce the greatest sales volume. For example, should the merchant group all like products together or group complementary products together or use some combination of these groupings?

CREATE TRIGGER life_cycle (product UPC_CODE): Examines product-placement and product-sales data over time and notifies the merchant when a product displayed at a particular location has lost its "stand-out" appeal and thus is experiencing reduced sales volume.

Computer-based and Other Implementations

The various implementations of the invention are realized in electronic hardware, computer software, or combinations of these technologies. Most implementations include one or more computer programs executed by a programmable computer. In general, the computer includes one or more processors, one or more data-storage components (e.g., volatile and nonvolatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

The text above describes one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. Many other embodiments are also within the scope of the following claims.

We claim:

1. A method for use in managing inventory in a retail store, the method comprising:
   acquiring product-identification data that identifies products placed on store shelves;
   acquiring product-placement data that identifies the locations of the products in the store;
   acquiring sales data that provides information about sales of the products;
   storing the product-identification, product-placement, and product sales data in a database system; and
   querying the database system to identify relationships between product sales and product placement.

2. The method of claim 1, where the step of acquiring product-placement data includes placing location labels on product packages to identify the locations of products in the store.

3. The method of claim 2, where the step of acquiring sales data includes acquiring information from the location labels as the products are sold.

4. The method of claim 1, where the step of acquiring product-placement data includes acquiring information from the store shelves as the products are placed on the shelves.

5. The method of claim 4, where the step of acquiring product-placement data includes acquiring information from location labels mounted on the store shelves.

6. The method of claim 1, where the step of acquiring product-placement data includes acquiring information that indicates a product's distance from a store floor.

7. The method of claim 1, where the step of acquiring sales data includes acquiring product-identification data as the products are sold.

8. The method of claim 1, where the step of acquiring sales data includes acquiring information that distinguishes like products placed at different locations in the store.

9. The method of claim 1, where the step of querying the database includes calculating a physical distance between two types of products that will optimize joint sales of those products.

10. The method of claim 1, where the step of querying the database includes calculating a physical distance between two types of products that will preserve a minimum acceptable level of joint sales of the products.

11. The method of claim 1, where the step of querying the database includes predicting whether a particular product arrangement will produce acceptable levels of sales.

12. The method of claim 1, where the step of querying the database includes identifying product arrangements that have not produced acceptable levels of sales.

13. A data-processing system for use in managing inventory in a retail store, where the data-processing system includes executable instructions that are stored on a tangible storage medium and that, when executed by a computer processor, cause the computer to:

receive product-identification data that identifies products placed on store shelves;

receive product-placement data that identifies the locations of the products in the store;

receive sales data that provides information about sales of the products;

store the product-identification, product-placement, and sales data in a database system; and query the database system to identify relationships between product sales and product placement.

14. The system of claim 13, where the computer, in querying the database system, calculates a physical distance between two types of products that will optimize joint sales of those products.

15. The system of claim 13, where the computer, in querying the database, calculates a physical distance between two types of products that will preserve a minimum acceptable level of joint sales of the products.

16. The system of claim 13, where the computer, in querying the database, predicts whether a particular product arrangement will produce acceptable levels of sales.

17. The system of claim 13, where the computer, in querying the database, identifies product arrangements that have not produced acceptable levels of sales.

18. An inventory-management system for use in a retail store, the system comprising:

one or more data-collection terminals configured to acquire product-identification data identifying products placed on store shelves, product-placement data identifying the locations of the products in the store, and sales data providing information about sales of the products;

a database system configured to receive and store the product-identification, product-placement, and product sales data collected by the terminals; and a database-query component configured to query the database system to identify relationships between product sales and product placement.

19. The system of claim 18, where at least one terminal is configured to generate location labels for use on the product packages in identifying the locations of the products in the store.

20. The system of claim 19, where at least one terminal is configured to acquire information from the location labels as the products are sold.

21. The system of claim 18, where at least one terminal is configured to acquire information from the store shelves as the products are placed on the shelves.

22. The system of claim 21, where the terminal is configured to acquire information from location labels mounted on the store shelves.

23. The system of claim 18, where the product-placement data includes information that indicates a product's distance from a store floor.

24. The system of claim 18, where at least one terminal is configured to acquire product-identification data as the products are sold.

25. The system of claim 24, where the terminal is configured to acquire information that distinguishes like products placed at different locations in the store.

26. The system of claim 18, where the database-query component is configured to calculate a physical distance between two types of products that will optimize joint sales of those products.

27. The system of claim 18, where database-query component is configured to calculate a physical distance between two types of products that will preserve a minimum acceptable level of joint sales of the products.

28. The system of claim 18, where the database-query component is configured to predict whether a particular product arrangement will produce acceptable levels of sales.

29. The system of claim 18, where the database-query component is configured to identify product arrangements that have not produced acceptable levels of sales.

* * * * *